United States Patent [19]

Kaneko

[11] 3,980,815

[45] Sept. 14, 1976

[54] WHITE LEVEL CLIPPING CIRCUIT

[75] Inventor: Shinji Kaneko, Atsugi, Japan

[73] Assignee: Sony Corporation, Tokyo, Japan

[22] Filed: Mar. 31, 1975

[21] Appl. No.: 563,518

[30] Foreign Application Priority Data

Apr. 4, 1974 Japan.............................. 49-38180

[52] U.S. Cl. ............................ 178/7.3 DC; 360/33; 178/DIG. 12
[51] Int. Cl.².......................................... H04N 5/16
[58] Field of Search ................ 178/DIG. 12, 7.30 C; 330/11, 29; 307/237; 358/29

[56] References Cited
UNITED STATES PATENTS

| | | | |
|---|---|---|---|
| 3,557,305 | 3/1968 | Dann............................. | 178/7.3 DC |
| 3,573,352 | 4/1971 | Fujita............................. | 358/29 |
| 3,595,993 | 8/1969 | Pratt............................. | 178/DIG. 12 |
| 3,666,969 | 5/1972 | Karrier et al. .................... | 307/237 |
| 3,737,678 | 6/1973 | Dolby et al. .................... | 330/29 |
| 3,878,325 | 4/1975 | Cecchin et al..................... | 178/7.3 |

*Primary Examiner*—Robert L. Griffin
*Assistant Examiner*—Aristotelis M. Psitos
*Attorney, Agent, or Firm*—Lewis H. Eslinger; Alvin Sinderbrand

[57] ABSTRACT

A white level clipping circuit has an impedance element through which a video signal is supplied from an input terminal to an output terminal, the emitter of a PNP-type transistor is connected to the output side of the impedance element and the collector thereof is grounded while the base of the transistor is supplied with a constant bias voltage to effect white level clipping of the video signal derived at the output terminal. This clipping circuit carries out positive clipping operation with no frequency characteristics and hence avoids possible overmodulation when the clipped video signal is frequency-modulated for the recording thereof.

3 Claims, 5 Drawing Figures

WHITE LEVEL CLIPPING CIRCUIT

BACKGROUND OF THE INVENTION

1. Field of the Invention

This invention relates generally to a VTR (video tape recorder) frequency modulating circuit, and more particularly is directed to a white level clipping circuit which clips the white peak of a video signal to prevent the FM signals obtained therefrom from being over-modulated.

2. Description of the Prior Art

In a prior art clipping circuit, the anode of a diode provided for clipping is connected between the input and output terminals of the circuit, and the cathode of the diode is supplied with a constant bias voltage and also by-passed or connected to ground through a parallel circuit of a resistor and a capacitor.

When the white peak level of a video signal exceeds the sum voltage of the forward voltage across the diode and its cathode voltage, the diode becomes conductive or is ON and the white peak portion is by-passed through the diode and the parallel circuit of the resistor and capacitor. Thus, a clipped video signal is delivered to the output terminal.

In this prior art circuit, however, when the diode is ON, the impedance from its anode to the ground is high. Therefore, the white peak may not be clipped sufficiently or frequency characteristics may be imparted thereto by the provision of the capacitor.

SUMMARY OF THE INVENTION

According to an aspect of this invention, a clipping circuit comprises an impedance element through which a video signal is supplied from an input terminal to an output terminal, the emitter of an NPN-type transistor is connected to the output side of the impedance element and the collector thereof is grounded while the base of the transistor is supplied with a constant bias voltage to obtain a white level clipped video signal at the output terminal. Since the transistor is connected as an emitter follower configuration, its output impedance from its emitter is sufficiently low, so that the white peak of a video signal can be clipped positively without frequency characteristics. Accordingly, in a VTR provided with such a clipping circuit, an FM signal is not over-modulated and the transistor is not made OFF with a high white peak. The clipping circuit of this invention is comprised of a small number of elements and hence consumes relatively little power.

Accordingly, an object of this invention is to provide an improved white level clipping circuit for use in a video recording circuit.

Still another object of this invention is to provide an improved white level clipping circuit which eliminates over-modulation in a frequency modulator.

The above, and other objects, features and advantages of this invention will become apparent from the following description taken in conjunction with the accompanying drawings.

DESCRIPTION OF THE PREFERRED EMBODIMENTS

Figure 1:
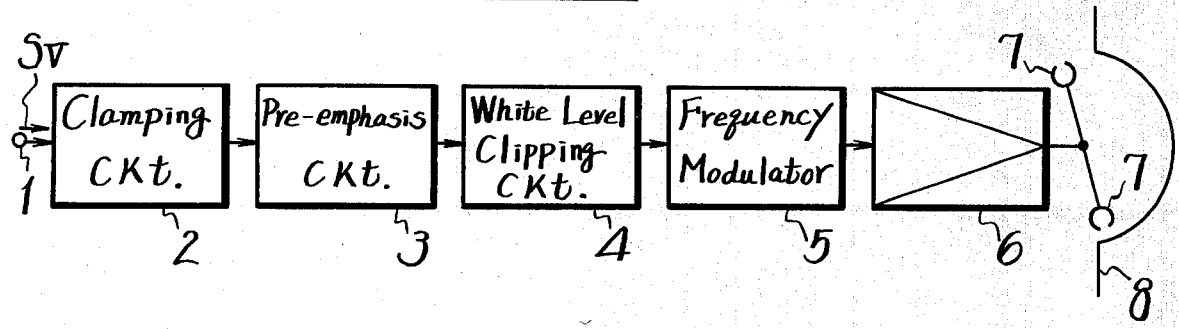
FIG. 1 is a schematic block diagram showing the recording system of a VTR.

In the recording system of a VTR, as shown in FIG. 1, a video signal $S_V$ is fed through an input terminal 1, a clamping circuit 2, a pre-emphasis circuit 3 and a white level clipping circuit 4 to a frequency modulator 5 to be an FM (frequency-modulated) signal. The FM signal is then supplied through a recording amplifier 6 to rotary magnetic heads 7 and recorded thereby on a magnetic tape 8.

Figure 2:
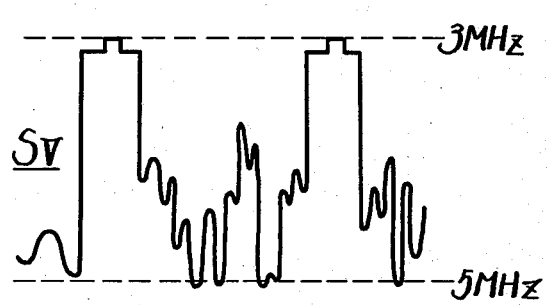
FIG. 2 is a waveform diagram used for explaining the system shown in FIG. 1.

In this system, the clamping circuit 2 ensures that the sync-chip level of the video signal $S_V$ is maintained constant, and when the video signal $S_V$ is converted to an FM signal, the sync-chip of the video signal $S_V$ is made to always have a predetermined frequency, for example, 3 MHz as shown in FIG. 2. The white level clipping circuit 4 serves to restrict the white peak level of the video signal $S_V$ and ensures that the frequency shift or displacement of the FM signal at the white peak does not exceed, for example, 5 MHz so that the video signal is not over-modulated.

Figure 3:
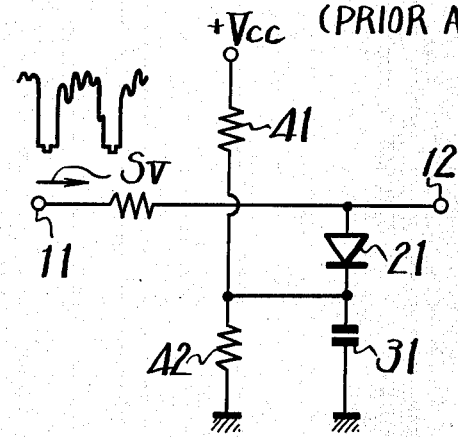
FIG. 3 is a connection diagram of a prior art white level clipping circuit.

An example of a prior art white level clipping circuit will be now described with reference to FIG. 3. In FIG. 3, reference numeral 11 indicates an input terminal, 12 an output terminal and 21 a diode for clipping, respectively. The video signal $S_V$ is applied to the input terminal 11 at a polarity shown in the figure. When the white peak level of the video signal $S_V$ exceeds the sum voltage of the forward voltage of the diode 21 and its cathode voltage, the diode 21 becomes conductive or ON. Therefore, the white peak portion is by-passed through the diode 21 and the parallel circuit of a capacitor and resistors 41 and 42, and hence the video signal $S_V$ whose white peak is clipped is obtained at the output terminal 12.

However, with the prior art circuit shown in FIG. 3, since the impedance viewed from the anode of the diode 21 to the ground is high when the diode 21 is ON, the white peak can not be clipped sufficiently or frequency characteristics are imparted to the circuit by the provision of the capacitor 31.

An embodiment of the white level clipping circuit according to this invention, which is free of the defects encountered in the prior art, will now be described with reference to FIG. 4.

Figure 4:
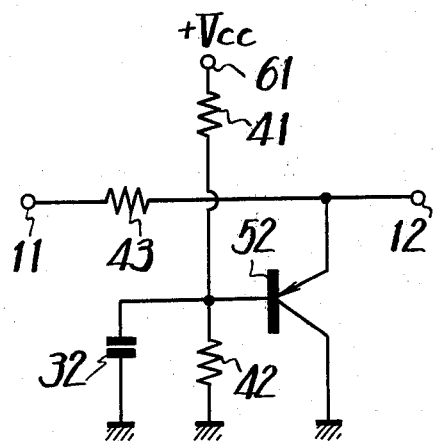
FIGS. 4 and 5 are connection diagrams showing respective embodiments of the white level clipping circuit according to this invention.

In FIG. 4, reference numeral 11 denotes an input terminal which is supplied with the video signal $S_V$. This input terminal 11 is connected to an output terminal 12 through an impedance element such as a resistor 43, and the output terminal 12 is connected to the emitter of a PNP-type transistor 52 whose collector is grounded. A series connection of resistors 41 and 42 is connected between a voltage source terminal 61 of $+V_{cc}$ and the ground as a bias source for setting a clipping level. A capacitor 32 is connected in parallel to the resistor 42, and the connection point between the resistors 41 and 42 and the capacitor 32 is connected to the base of the transistor 52.

With the embodiment of the invention shown in FIG. 4, when an instant level of the video signal $S_V$ applied to the input terminal 11 is lower than the sum voltage of the base voltage (in respect to ground) of the transistor 52 and its base-emitter voltage $V_{BE}$, the transistor 52 is in an OFF-state. Accordingly, in such case, the video signal $S_V$ applied to the input terminal 11 is delivered, as it is, through the resistor 43 to the output terminal 12. However, when an instant level of the video signal $S_V$ exceeds the sum voltage of the base voltage and base-emitter voltage $V_{BE}$ of the transistor 52, the transistor 52 is turned ON. Therefore, in the latter case, the white peak portion of the video signal $S_V$ is by-passed to ground through the emitter-collector path of the transistor 52 or is clipped. Thus, the video signal $S_V$ whose white peak is clipped is obtained at the output terminal 12.

Figure 5:
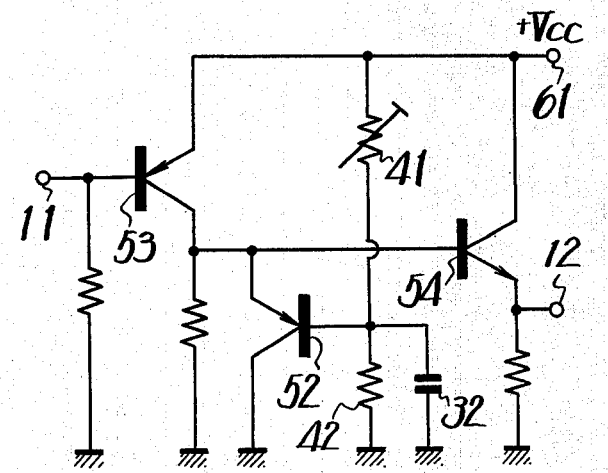

FIG. 5 shows another embodiment of the invention in which the reference numerals used in FIG. 4 are employed to represent the same elements.

In the embodiment shown in FIG. 5, a transistor 53 of emitter-grounded configuration is used as the impedance element in place of the resistor 43 in the embodiment of FIG. 4, and the video signal $S_V$ whose white peak is clipped is delivered to the output terminal 12 through an emitter-follower configuration transistor 54. Further, in FIG. 5, the resistor 41 is made variable for setting the clipping level. Apart from the foregoing the clipping circuit of FIG. 5 is the same as that described above with reference to FIG. 4 and has substantially the same advantageous mode of operation.

It will be apparent that many modifications and variations could be effected in the above described embodiments of the invention by one skilled in the art without departing from the spirit or scope of the novel concepts of the present invention.

I claim as my invention:

1. In a recording circuit of a video tape recorder in which a video signal is passed through a white level clipping circuit to a frequency modulator to provide a frequency modulated video signal to be recorded: said white level clipping circuit comprising input and output terminals with a conductive path therebetween for carrying the video signal from said input terminal to said output terminal; an impedance element interposed in said conductive path; a PNP-type transistor having emitter, base and collector electrodes, said emitter electrode being connected to said conductive path between said impedance element and said output terminal, and said collector electrode being directly connected to ground; and means for applying a predetermined bias voltage to said base electrode so that said transistor is turned ON to by-pass the white peak portion of the video signal to ground only when the instant level of the video signal exceeds the sum of said bias voltage and the base-emitter voltage of said transistor.

2. A recording circuit of a video tape recorder according to claim 1; in which said impedance element is constituted by a PNP-type transistor having a base electrode connected to said input terminal and a collector electrode connected to said emitter electrode of the first mentioned transistor.

3. A recording circuit of a video tape recorder according to claim 2; in which said conductive path further includes a transistor of emitter-follower configuration for delivering the clipped video signal to said output terminal.

* * * * *